United States Patent
Hamaguchi

(10) Patent No.: US 7,822,994 B2
(45) Date of Patent: Oct. 26, 2010

(54) DATA BUS LINE AND BUS HAVING AN ENCRYPTION/DECRYPTION DEVICE

(75) Inventor: Junichiro Hamaguchi, Pleasanton, CA (US)

(73) Assignee: Konica Minolta Systems Laboratory, Inc., Foster City, CA (US)

(*) Notice: Subject to any disclaimer, the term of this patent is extended or adjusted under 35 U.S.C. 154(b) by 981 days.

(21) Appl. No.: 11/030,087

(22) Filed: Jan. 7, 2005

(65) Prior Publication Data

US 2006/0156034 A1 Jul. 13, 2006

(51) Int. Cl.
G06F 11/00 (2006.01)
H04N 7/167 (2006.01)

(52) U.S. Cl. ............ 713/193; 380/202

(58) Field of Classification Search ........... 713/193; 380/202
See application file for complete search history.

(56) References Cited

U.S. PATENT DOCUMENTS

| | | | | |
|---|---|---|---|---|
| 5,249,232 A * | 9/1993 | Erbes et al. | ........... | 713/190 |
| 5,394,469 A * | 2/1995 | Nagel et al. | ........... | 705/53 |
| 5,687,237 A * | 11/1997 | Naclerio | ........... | 380/29 |
| 5,864,747 A * | 1/1999 | Clark et al. | ........... | 725/67 |
| 5,943,421 A * | 8/1999 | Grabon | ........... | 380/269 |
| 6,038,320 A * | 3/2000 | Miller | ........... | 380/44 |
| 6,594,747 B2 * | 7/2003 | Takayasu | ........... | 711/163 |
| 6,996,725 B2 * | 2/2006 | Ma et al. | ........... | 726/22 |
| 7,240,345 B2 * | 7/2007 | Sueyoshi et al. | ........... | 717/161 |
| 7,248,696 B2 * | 7/2007 | Craft et al. | ........... | 380/263 |
| 2002/0016894 A1 * | 2/2002 | Takayasu | ........... | 711/163 |
| 2002/0091935 A1 * | 7/2002 | Smith et al. | ........... | 713/189 |
| 2002/0164022 A1 * | 11/2002 | Strasser et al. | ........... | 380/201 |
| 2002/0169902 A1 * | 11/2002 | Horiuchi et al. | ........... | 710/69 |
| 2003/0046563 A1 * | 3/2003 | Ma et al. | ........... | 713/190 |
| 2003/0048900 A1 * | 3/2003 | Kim et al. | ........... | 380/229 |
| 2003/0140179 A1 | 7/2003 | Wilt et al. | | |
| 2004/0003262 A1 * | 1/2004 | England et al. | ........... | 713/189 |
| 2004/0052375 A1 * | 3/2004 | Craft et al. | ........... | 380/256 |
| 2004/0236876 A1 | 11/2004 | Kondratiev et al. | | |
| 2004/0247129 A1 * | 12/2004 | Patariu et al. | ........... | 380/277 |
| 2004/0250092 A1 * | 12/2004 | Hori et al. | ........... | 713/189 |
| 2005/0008150 A1 * | 1/2005 | Liang | ........... | 380/28 |
| 2005/0076228 A1 * | 4/2005 | Davis et al. | ........... | 713/188 |
| 2005/0102497 A1 * | 5/2005 | Buer | ........... | 713/150 |
| 2006/0095703 A1 * | 5/2006 | Ferraiolo et al. | ........... | 711/170 |
| 2006/0112423 A1 * | 5/2006 | Villadiego et al. | ........... | 726/9 |
| 2007/0288922 A1 * | 12/2007 | Sueyoshi et al. | ........... | 718/100 |

* cited by examiner

Primary Examiner—Techane J Gergiso
(74) Attorney, Agent, or Firm—Finnegan, Henderson, Farabow, Garrett & Dunner, LLP

(57) ABSTRACT

The present application relates to a data bus line to secure secrecy of digital data without a complicated exchange of hardware and decreasing processing speed.

16 Claims, 2 Drawing Sheets

DATA BUS LINE AND BUS HAVING AN ENCRYPTION/DECRYPTION DEVICE

FIELD

The present invention relates to a bus and a data bus line which are configured to be able to encrypt and/or decrypt digital data transferred through the bus and the data bus line.

INTRODUCTION

In order to secure secrecy of digital data including important information when the digital data is transferred, encryption and/or decryption of digital data is widely applied.

However, if a user wants to apply the encryption/decryption process by using the user's conventional hardware, the application of the encryption/decryption exhibits certain drawback.

For example, the speed of processing digital data by the conventional hardware becomes slower when the encryption/decryption process is conducted by certain software installed into the conventional hardware. Alternatively, if the encryption/decryption process is conducted by a certain hardware incorporated newly into the conventional hardware, it is difficult to exchange or add the new hardware to the conventional hardware because it requires exchange of a lot of parts and the exchanging procedure is complicated for most users.

Therefore, it is desirable that encryption and/or decryption process can be conducted by using the conventional hardware without exchange of many parts and decrease of processing speed.

SUMMARY

According to various embodiments, the present teachings can provide a data bus line comprising an encryption/decryption device. The data bus line can connect an end device with a bus controller and transfer digital data between the end device and the bus controller. The encryption/decryption device can encrypt the digital data and decrypt the digital data.

According to various embodiments, the present teachings can provide a bus for connecting an end device with another device and transferring digital data between the end device and the another device. The bus can comprise a bus controller, a data bus line comprising an encryption/decryption device. The data bus line can connect the end device with the bus controller and transfer digital data between the end device and the bus controller. The encryption/decryption device can encrypt the digital data and decrypt the digital data.

DESCRIPTION OF CERTAIN EMBODIMENTS

Figure 1:
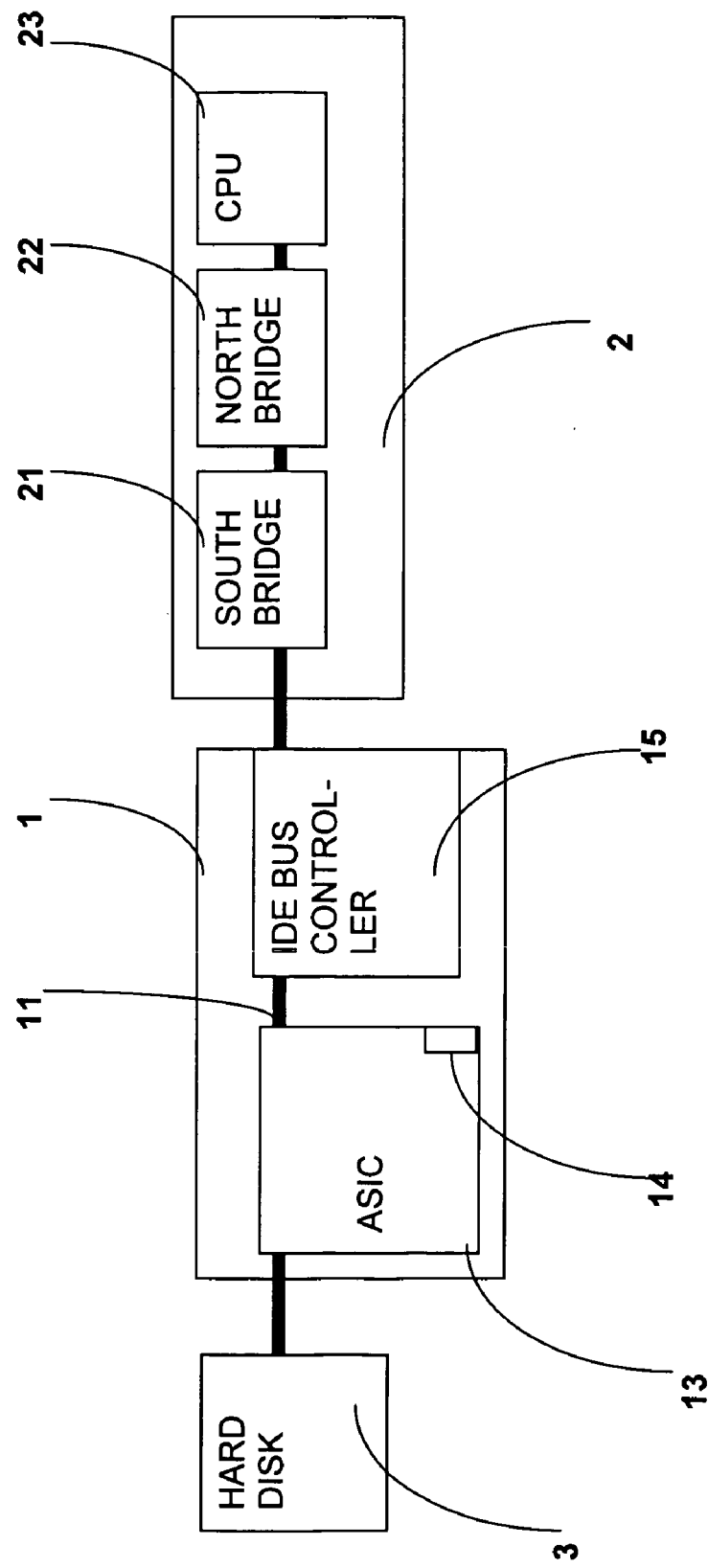
FIG. 1 illustrates a block diagram of a system comprising a bus and a data bus line, according to certain embodiments.

In certain embodiments, a bus can comprise a bus controller and a data bus line.

In certain embodiments, the bus can connect an end device with another device and transfer digital data between the end device and the another device. Examples of the bus consistent with certain embodiments of the invention include, but not limited to, a serial bus and a parallel bus. Examples of the bus consistent with certain embodiments of the invention include, but not limited to, an expansion bus, an external bus and an internal bus. Examples of the expansion bus and the external bus consistent with certain embodiments of the invention include, but are not limited to, a disk Input/Output (I/O) bus (e.g., Integrated Drive Electronics (IDE), Enhanced IDE, AT Attachment (ATA), ULTRA ATA), Universal Serial Bus (USB), Peripheral Components Interconnect (PCI) Bus, PCI-X Bus, Industrial Standard Architecture (ISA) Bus, Institute of Electrical and Electronic Engineers 1394 (IEEE 1394) Bus, Small Computer System Interface (SCSI) Bus, GPIB. In certain embodiments, the bus can connect with a south bridge (in other words, an I/O controller hub, an I/O bus hub or a bus hub) of a personal computer. Although in certain embodiments, the bus can connect with a north bridge (in other words, a memory controller hub) of the personal computer, preferably the bus can connect with the south bridge.

In certain embodiments, the data bus line of the bus can connect the end device with the bus controller of the bus and transfer digital data between the end device and the bus controller. In certain embodiments, the data bus line of the bus can connect the end device with the another device through the bus controller of the bus. Examples of the data bus line consistent with certain embodiments of the invention include, but not limited to, a data bus line of a disk I/O bus (e.g., IDE, Enhanced IDE, ATA, ULTRA ATA), a data bus line of USB, a data bus line of PCI Bus, a data bus line of PCI-X Bus, a data bus line of C-Bus, a data bus line of ISA Bus, a data bus line of IEEE 1394 Bus, a data bus line of SCSI Bus, a data bus line of GPIB. In certain embodiments, the data bus line can connect with the south bridge of the personal computer through the bus controller of the bus. Although in certain embodiments, the data bus line can connect with the north bridge of the personal computer through the bus controller of the bus, preferably the data bus line can connect with the south bridge. In certain embodiments, the data bus line can comprise an encryption/decryption device.

Examples of the bus controller consistent with certain embodiments of the invention include, but not limited to, a bus controller of a disk I/O bus (e.g., IDE, Enhanced IDE, ATA, ULTRA ATA), USB controller, PCI Bus controller, PCI-X Bus controller, C-Bus controller, ISA Bus controller, IEEE 1394 Bus controller, SCSI Bus controller, GPIB controller.

In certain embodiments, the end device can be a device which connects with the bus, sends and/or receives digital data to and/or from the bus, and does not send another bus the digital data sent from the bus. Examples of the end device consistent with certain embodiments of the invention include, but not limited to, a data recording device and a image displaying device.

In certain embodiments, the data recording device can record digital data. Examples of the data recording device consistent with certain embodiments of the invention include, but not limited to, a digital memory card reader/recorder, a hard disk drive, a floppy disk drive, a compact disc (CD) (e.g., CD-R, CD-RW, etc.) drive, a digital versatile disk (DVD) (e.g., DVD-R, DVD-RW, DVD+RW, etc.) drive and a magnetic-optical (MO) disk drive. Examples of a digital memory card for the digital memory card reader/recorder consistent with certain embodiments of the invention include, but not limited to, secure digital (SD) memory cards, Compact Flash™, Smart Media™, Memory Stick™, and the like. In certain embodiments, the data recording device can record digital data sent from the another device, such as a personal computer and the like, through the bus. In certain embodiments, the digital data recorded in the data recording device can be read and sent to the another device through the bus.

In certain embodiments, the image displaying device can display an image generally corresponding to digital data. Examples of the image displaying device consistent with certain embodiments of the invention include, but not limited to, a liquid crystal display (LCD), a Braun tube, a cathode ray tube (CRT), and a plasma display panel. In certain embodiments, the image displaying device can display the image generally corresponding to the digital data sent from another device, such as a personal computer and the like, through the bus.

In certain embodiments, the another device can be a device which connects with the end device through the bus and sends and/or receives digital data to and/or from the end device through the bus. Examples of the another device consistent with certain embodiments of the invention include, but not limited to, a personal computer, a central processing unit (CPU) (in other words, a micro processing unit (MPU)), the north bridge and the south bridge.

In certain embodiments, the data bus line can comprise the encryption/decryption device. In certain embodiments, the encryption/decryption device can encrypt the digital data transferred between the end device and the another device through the bus and/or decrypt the digital data. In certain embodiments, the encryption/decryption device can encrypt the digital data transferred between the end device and the bus controller through the data bus line and/or decrypt the digital data. Examples of the encryption/decryption device consistent with certain embodiments of the invention include, but not limited to, an application specific integrated circuit (ASIC), a CPU with a memory and software for encryption/decryption, a field programmable gate array (FPGA) and a programmable logic device (PLD). In certain embodiments, the encryption/decryption device can be designed so that signal latency and signal skew are within the margin specified in the specification of the bus. In certain embodiments, the encryption/decryption device can intercept the digital data which flows from the end device to the another device or from the another device to the end device, without sending a request of such digital data from the bus. In certain embodiments, if the bus is a bus for Plug and Play, algorithm for extracting the digital data to be encrypted and/or decrypted can be utilized with the encryption/decryption device. In certain embodiments, power for the encryption/decryption device can be supplied from the end device and/or the another device to the encryption/decryption device by sharing power supplied to the end device and/or the another device. In certain embodiments, power for the encryption/decryption device can be supplied from another power supply (e.g., an outlet, a battery and the like) to the encryption/decryption device directly. In certain embodiments, the encryption/decryption device can encrypt and/or decrypt digital data by algorithm based on a public key cryptosystem (e.g., RSA data security, RC2, RC4, RC5 and the like) or a secret key cryptosystem (e.g., Triple DES and the like). In certain embodiments, the encryption/decryption device can encrypt and/or decrypt digital data by algorithm based on a challenge-response. In certain embodiments, the encryption/decryption device can encrypt and/or decrypt digital data by algorithm based on other simple cryptography. In certain embodiments, such simple cryptography can utilize a bit operation which can be calculated backward. In certain embodiments, such simple cryptography can utilize a check sum. For instance, data of some bits can be extracted from the digital data and a check sum of the extracted data can be calculated and utilized for the cryptography. In certain embodiments, such simple cryptography can utilize a random numbers. For instance, certain random number can be produced and the digital data can be converted and/or appended by utilizing the random number. In certain embodiments, Hash function (e.g., Message Digest 5 and the like) can be utilized to produce the random number. In certain embodiments, if the ASIC is used as the encryption/decryption device, the algorithm for encryption and/or decryption can be realized by a design of a circuit of the ASIC. In certain embodiments, if the CPU or MPU is used as the encryption/decryption device, the algorithm for encryption and/or decryption can be realized by software for encryption/decryption which runs on the CPU or MPU.

In certain embodiments, the end device can be the data recording device and the another device can be the personal computer. In certain embodiments, the data recording device and the personal computer can be connected through the bus comprising the bus controller and the data bus line. The data bus line can comprise the encryption/decryption device. In certain embodiments, the data recording device can record encrypted data. The encrypted data can be read from the data recording device and sent from the data recording device to the encryption/decryption device of the data bus line. In certain embodiments, the encrypted data can be decrypted by the encryption/decryption device. Then, the decrypted data can be sent from the encryption/decryption device of the data bus line to the bus controller. The bus controller can send the decrypted data to the personal computer. Meanwhile, the personal computer can send certain digital data to the bus controller. The bus controller can send the digital data to the encryption/decryption device of the data bus line. The sent data can be encrypted by the encryption/decryption device and the encrypted data can be sent from the encryption/decryption device of the data bus line to the data recording device. The data recording device can record the encrypted data.

In certain embodiments, the end device can be the image displaying device and the another device can be the personal computer. In certain embodiments, the image displaying device and the personal computer can be connected through the bus comprising the bus controller and the data bus line. The data bus line can comprise the encryption/decryption device. In certain embodiments, the image displaying device can display image generally corresponding to digital data sent from the personal computer through the bus. In certain embodiments, the personal computer can send certain encrypted data to the bus controller. The bus controller can send the encrypted data to the encryption/decryption device of the data bus line. The sent encrypted data can be decrypted by the encryption/decryption device and the decrypted data can be sent from the encryption/decryption device of the data bus line to the image displaying device. The image displaying device can display the image generally corresponding to the decrypted data.

In certain embodiments, the data bus line and/or the bus can comprise a memory device. In certain embodiments, the memory device can store algorithm for encryption and/or decryption. Examples of the memory device consistent with certain embodiments of the invention include, but not limited to, a non volatile memory (e.g., a non volatile random access memory (NVRAM), M RAM, P RAM, Fe RAM, Flash RAM and the like) and a hard disk. In certain embodiments, if the encryption/decryption device is the ASIC, the memory device which stores algorithm for encryption and/or decryption might be not required. In certain embodiments, if the encryption/decryption device is the CPU or the MPU, the memory device which stores algorithm for encryption and/or decryption is preferable. In certain embodiments, the memory device can comprise a removable medium being detachable with the memory device and storing the algorithm for encryption and/or decryption. By exchanging the removable medium, the algorithm of encryption/decryption can be changed easily. Examples of the removable medium consistent with certain embodiments of the invention include, but not limited to, a digital memory card (e.g., SD memory cards, Compact Flash™, Smart Media™, Memory Stick™, and the like).

In certain embodiments, the data bus line and/or the bus can comprise an identification detecting device and an ID memory device. In certain embodiments, the identification detecting device can detect a device ID of at least one of the bus controller, the end device and the another device. Examples of the identification detecting device consistent with certain embodiments of the invention include, but not limited to, ASIC, CPU or MPU (with software, if necessary), FPGA and PLD. In certain embodiments, the identification detecting device can intercept the device ID which flows from the end device to the another device or from the another device to the end device, without sending a request of the device ID from the bus. In certain embodiments, the identification detecting device and/or the bus might not request command data and/or status. In certain embodiments, the identification detecting device and/or the bus might not handshake. In certain embodiments, the identification detecting device can comprise the ASIC. In certain embodiments, the identification detecting device and the encryption/decryption device can be one same component. In certain embodiments, the identification detecting device and the encryption/decryption device can be different components. In certain embodiments, the device ID can be an information to identify at least one of the kind of the device, the lot number of the device and the device itself. Examples of the device ID consistent with certain embodiments of the invention include, but not limited to, Ethernet MAC address, Disk ID and USB ID. In certain embodiments, the ID memory device can store the device ID detected by the identification detecting device. Examples of the ID memory device consistent with certain embodiments of the invention include, but not limited to, the non volatile memory (e.g., NVRAM, M RAM, P RAM, Fe RAM, Flash RAM and the hard disk. In certain embodiments, even if the encryption/decryption device is the ASIC, the ID memory device can be preferable. In certain embodiments, if the encryption/decryption device is the CPU or the MPU, the ID memory device can be preferable. In certain embodiments, the ID memory device can comprise a removable medium being detachable with the ID memory device and storing the device ID. Examples of the removable medium consistent with certain embodiments of the invention include, but not limited to, the digital memory card (e.g., SD memory cards, Compact Flash™, Smart Media™, Memory Stick™, and the like). In certain embodiments, the ID memory device and the memory device for the algorithm of encryption/decryption can be one same component. In certain embodiments, the ID memory device and the memory device can be different components.

In certain embodiments, only if the identification detecting device detects that the device ID of at least one of the bus controller, the end device and the another device is correct, the encryption/decryption device can encrypt and/or decrypt the digital data. In certain embodiments, only if the identification detecting device detects that all of the device ID of the bus controller, the end device and the another device are correct, the encryption/decryption device can encrypt and/or decrypt the digital data. In certain embodiments, if the identification detecting device compares the device ID detected by the identification detecting device with the device ID stored in the ID memory device and the device ID stored in the ID memory device is consistent with the device ID detected by the identification detecting device, the device ID detected by the identification detecting device can be regarded as a correct device ID.

In certain embodiments, the end device can be the data recording device and the another device can be the personal computer. In certain embodiments, the data recording device and the personal computer can be connected through the bus comprising the bus controller and the data bus line. The data bus line can comprise the encryption/decryption device, the identification detecting device and the ID memory device. In certain embodiments, the device ID of the data recording device can be sent to the personal computer through the bus and the identification detecting device can intercept the device ID which flows from the data recording device to the personal computer. In certain embodiments, the ID memory device can store the device ID of the data recording device. If the data recording device is removed from the bus and then connected again to the bus, the device ID of the data recording device can be sent from the data recording device to the personal computer through the bus and the identification detecting device can intercept the device ID again. In certain embodiments, the device ID sent from the data recording device can be compared with the device ID stored in the ID memory device by the identification detecting device. If the device ID sent from the data recording device is consistent with the device ID stored in the ID memory device, the encryption/decryption device can encrypt and/or decrypt the digital data sent from and/or to the data recording device. If the device ID sent from the data recording device is not consistent with the disk ID stored in the ID memory device, the encryption/decryption device can be prohibited to encrypt and/or decrypt the digital data sent from and/or to the data recording device and then the encrypted data stored in the data recording device cannot be processed by the personal computer.

Example 1

In certain embodiments, as illustrated in FIG. 1, the bus (e.g., an IDE bus 1) can comprise the bus controller (e.g., an IDE bus controller 15) and the data bus line (e.g. an IDE data bus line 11) comprising the encryption/decryption device (e.g., an ASIC 13), the identification detecting device (e.g., the ASIC 13) and the ID memory device (e.g. Flash RAM 14). In certain embodiments, the IDE bus 1 can connect the data recording device (e.g., a hard disk 3) as the end device with the another device (e.g., a personal computer 2) through the IDE bus 1. In certain embodiments, digital data can be transferred between the hard disk 3 and the personal computer 2 through the IDE bus 1. In certain embodiments, the personal computer 2 can comprise a south bridge 21, a north bridge 22 and a CPU 23. In certain embodiments, the IDE bus 1 can connect the south bridge 21 of the personal computer 2 with the hard disk 3 through the IDE bus 1.

In certain embodiments, power for the ASIC 13 can be supplied from the personal computer 2 or the hard disk 3 to the IDE bus 1. In certain embodiments, even if the power for the ASIC 13 cannot be supplied, the IDE bus 1 can transfer the digital data between the hard disk 3 and the personal computer 2 but cannot encrypt and/or decrypt the digital data transferred through the IDE bus 1. In certain embodiments, power for the hard disk 3 can be supplied from another outlet (not shown) directly. Also, power for the personal computer 2 can be supplied from another outlet (not shown) directly.

In certain embodiments, after connecting the hard disk 3 with the south bridge 21 of the personal computer 2 through the IDE bus 1, if the hard disk 3 is turned on, the device ID (e.g., Disk ID) of the hard disk 3 can be sent from the hard disk 3 to the personal computer 2 through the data bus line 11. Then, if the IDE bus 1 is turned on, the ASCI 13 can intercept the Disk ID which flows from the hard disk 3 to the personal computer 2 and the intercepted Disk ID can be stored in the Flash RAM 14.

In certain embodiments, after the hard disk 3, the IDE bus 1 and the personal computer 2 are turned on, according to user's operation, the personal computer 2 can send certain digital data to the IDE bus controller 15 of the IDE bus 1 through the south bridge 21. The IDE bus controller 15 can send the digital data to the ASIC 13 through the IDE data bus line 11. In certain embodiments, the ASIC can be designed so that the ASIC 13 can encrypt and/or decrypt the digital data according to the triple DES. In certain embodiments, the ASIC 13 can intercept the digital data sent from the personal computer 2 to the hard disk 3 and encrypt the digital data according to the triple DES. After encryption of the digital data by the ASIC 13, the encrypted data can be sent from the ASIC 13 to the hard disk 3 through the IDE data bus line 11 and the hard disk 3 can record the encrypted data. After recording encrypted data to the hard disk 3, the IDE bus 1 can be disconnected with the hard disk 3 and the personal computer 2.

In certain embodiments, the IDE bus 1 can be connected again with the hard disk 3 recording the encrypted data and the personal computer 2. After connecting with the hard disk 3 and the personal computer 2, if the hard disk 3 is turned on, the Disk ID of the hard disk 3 can be sent from the hard disk 3 to the personal computer 2. If the IDE bus 1 is turned on, the ASIC 13 can intercept the Disk ID which flows from the hard disk 3 to the personal computer 2 and compare the Disk ID sent from the hard disk 3 with the Disk ID stored in the Flash RAM 14. In certain embodiments, if the ASIC 13 judges that the Disk ID sent from the hard disk 3 is consistent with the Disk ID stored in the Flash RAM 14, the ASIC 13 can allow to encrypt and/or decrypt the digital data sent from and/or to the hard disk 3. In certain embodiments, if the ASIC 13 judges that the Disk ID sent from the hard disk 3 is not consistent with the Disk ID stored in the Flash RAM 14, the ASIC 13 can be prohibited to encrypt and/or decrypt the digital data sent from and/or to the hard disk 3. In certain embodiments, even if the ASIC 13 is prohibited to encrypt and/or decrypt the digital data sent from and/or to the hard disk 3, the digital data can be transferred through the IDE bus 1.

In certain embodiments, ASIC 13 judges that the Disk ID sent from the hard disk 3 is correct, the encrypted data recorded in the hard disk 3 can be read from the hard disk 3 and sent from the hard disk 3 to the personal computer 2 through the IDE data bus line 11. The ASIC 13 can intercept the encrypted data which sent from the hard disk 3 to the personal computer 2 and decrypt the encrypted data according to the triple DES. Then, the decrypted data can be sent from the ASIC 13 to the IDE bus controller 15 through the IDE data bus line 11. The IDE bus controller 15 can send the decrypted data to the south bridge 21 of the personal computer 2 and the personal computer 2 can receive the decrypted data. The personal computer 2 can process the decrypted data sent from the IDE bus 1 as well as the other normal digital data.

Example 2

Figure 2:
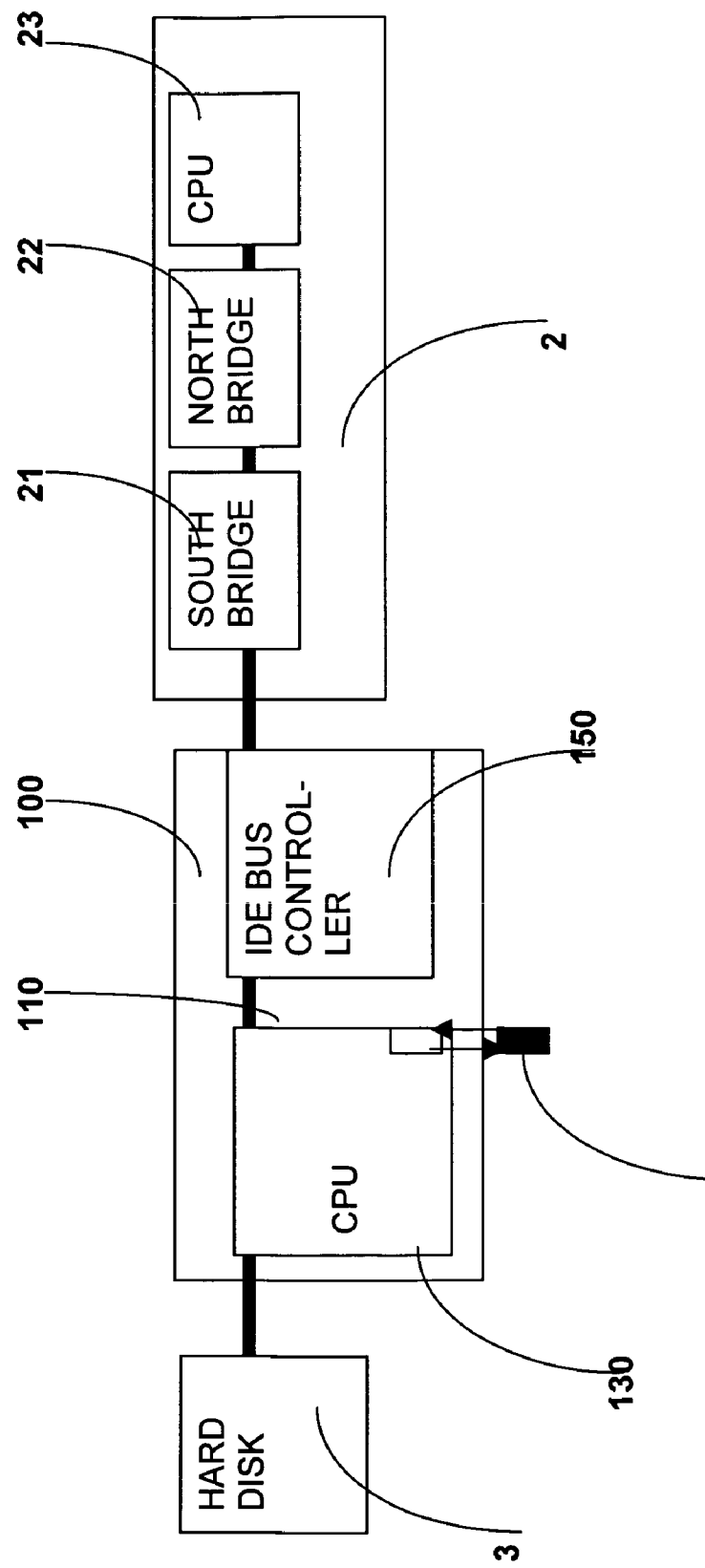
FIG. 2 illustrates a block diagram of a system comprising a bus and a data bus line, according to another embodiments.

In certain embodiments, as illustrated in FIG. 2, the bus (e.g., an IDE bus 100) can comprise the bus controller (e.g., an IDE bus controller 150) and the data bus line (e.g. an IDE data bus line 110) comprising the encryption/decryption device (e.g., a CPU 130), the identification detecting device (e.g., the CPU 130) and the removable memory (e.g. Compact Flash 140) as the memory device and the ID memory device. In certain embodiments, the Compact Flash 140 is detachable from the IDE bus 100. In certain embodiments, the IDE bus 100 can connect the data recording device (e.g., a hard disk 3) as the end device with the another device (e.g., a personal computer 2) through the IDE bus 100. In certain embodiments, digital data can be transferred between the hard disk 3 and the personal computer 2 through the IDE bus 100. In certain embodiments, the personal computer 2 can comprise a south bridge 21, a north bridge 22 and a CPU 23. In certain embodiments, the IDE bus 100 can connect the south bridge 21 of the personal computer 2 with the hard disk 3 through the IDE bus 100.

In certain embodiments, power for the CPU 130 can be supplied from an outlet (not shown) to the IDE bus 100 directly. In certain embodiments, even if the power for the CPU 130 cannot be supplied, the IDE bus 100 can transfer the digital data between the hard disk 3 and the personal computer 2 but cannot encrypt and/or decrypt the digital data transferred through the IDE bus 100. In certain embodiments, power for the hard disk 3 can be supplied from another outlet (not shown) directly. Also, power for the personal computer 2 can be supplied from another outlet (not shown) directly.

In certain embodiments, after connecting the hard disk 3 with the south bridge 21 of the personal computer 2 through the IDS bus 100 attaching the Compact Flash 140, if the hard disk 3 is turned on, the device ID (e.g., Disk ID) of the hard disk 3 can be sent from the hard disk 3 to the personal computer 2 through the IDE data bus line 110. Then, if the IDE bus 100 is turned on, the CPU 130 can intercept the Disk ID which flows from the hard disk 3 to the personal computer 2 and the Disk ID can be stored in the Compact Flash 140 as the ID memory device.

In certain embodiments, after the hard disk 3, the IDE bus 1 and the personal computer 2 are turned on, according to user's operation, the personal computer 2 can send certain digital data to the IDE bus controller 150 of the IDE bus 100 through the south bridge 21. The IDE bus controller 150 can send the digital data to the CPU 130 through the IDE data bus line 110. In certain embodiments, in the Compact Flash 140, algorithm of encryption/decryption (e.g., tripe DES) can be stored. In certain embodiments, the CPU 130 can intercept the digital data sent from the personal computer 2 to the hard disk 3 through the IDE data bus line 110 and encrypt the digital data according to the algorithm of the triple DES stored in the Compact Flash 140. After encryption of the digital data by the CPU 130, the encrypted data can be sent from the CPU 130 to the hard disk 3 through the IDE data bus line 110 and the hard disk 3 can record the encrypted data. After recording encrypted data to the hard disk 3, the IDE bus 100 can be disconnected with the hard disk 3 and the personal computer 2.

In certain embodiments, the IDE bus 100 attaching the Compact Flash 140 can be connected again with the hard disk 3 recording the encrypted data and the personal computer 2.

After connecting with the hard disk 3 and the personal computer 2, if the hard disk 3 is turned on, the Disk ID of the hard disk 3 can be sent from the hard disk 3 to the personal computer 2 through the IDE data bus line 110. If the IDE bus 100 is turned on, the CPU 130 can intercept the Disk ID and compare the Disk ID sent from the hard disk 3 with the Disk ID stored in the Compact Flash 140. In certain embodiments, if the CPU 130 judges that the Disk ID sent from the hard disk 3 is consistent with the Disk ID stored in the Compact Flash 140, the CPU 130 can allow to encrypt and/or decrypt the digital data sent from and/or to the hard disk 3. In certain embodiments, if the CPU 130 judges that the Disk ID sent from the hard disk 3 is not consistent with the Disk ID stored in the Compact Flash 140, the CPU 130 can be prohibited to encrypt and/or decrypt the digital data sent from and/or to the hard disk 3. In certain embodiments, even if the CPU 130 is prohibited to encrypt and/or decrypt the digital data sent from and/or to the hard disk 3, the digital data can be transferred through the IDE bus 100.

In certain embodiments, if CPU 130 judges that the Disk ID sent from the hard disk 3 is correct, the encrypted data recorded in the hard disk 3 can be read from the hard disk 3 and sent from the hard desk 3 to the personal computer 2 through the IDE data bus line 110. The CPU 130 can intercept the encrypted data sent from the hard disk 3 to the personal computer 2 and decrypt the encrypted data according to the algorithm of the tripe DES stored in the Compact Flash 140. Then, the decrypted data can be sent from the CPU 130 to the IDE bus controller 150 through the IDE data bus line 110. The IDE bus controller 150 can send the decrypted data to the south bridge 21 of the personal computer 2 and the personal computer 2 can receive the decrypted data. The personal computer 2 can process the decrypted data sent from the IDE bus 100 as well as the other normal digital data.

In certain embodiments, by exchanging the Compact Flash 140, the algorithm of encryption/decryption can be exchanged. In certain embodiments, by exchanging the Compact Flash 140, the same IDE bus 100 can be connected to a hard disk other than the hard disk 3 because disk ID of another hard disk can be recorded in the new Compact Flash 140.

Other various embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A data bus line, comprising:
    at least one encryption/decryption device, the at least one encryption/decryption device performing both encryption of digital data transferred on the data bus line and decryption of the digital data,
        wherein the data bus line connects at least one data storing device with a bus controller and transfers the digital data between the data storing device and the bus controller, and
        wherein the at least one encryption/decryption device encrypts the digital data received from the bus controller to store the encrypted digital data in the data storing device, and decrypts the encrypted digital data stored in the data storing device to deliver the decrypted digital data to the bus controller;
    an ID memory device which stores a device ID; and
    an identification detecting device which detects the device ID of at least one of the bus controller and an end device,
        wherein if the identification detecting device detects the device ID is correct, the encryption/decryption device is configured to encrypt or decrypt the digital data.

2. The data bus line of claim 1, wherein the data bus line is the data bus line of a disk I/O bus.

3. The data bus line of claim 1, wherein the data bus line is the data bus line of an USB.

4. The data bus line of claim 1, wherein the data bus line is the data bus line of a PCI bus.

5. The data bus line of claim 1, wherein the data bus line is the data bus line of an IEEE 1394 bus.

6. The data bus line of claim 1, wherein the data bus line connects with a south bridge through the bus controller.

7. The data bus line of claim 1, further comprising a memory device which stores at least one algorithm for encrypting the digital data and at least one algorithm for decrypting the digital data.

8. The data bus line of claim 7, wherein the memory device comprises a removable medium and,
    wherein the removable medium is detachable with the data bus line and, wherein the removable medium stores the at least one algorithm for encryption and the at least one algorithm for decryption.

9. A bus for connecting at least one data storing device with a second device and transferring digital data between the data storing device and the second device, comprising:
    a bus controller;
    a data bus line, the data bus line comprising:
        at least one encryption/decryption device, the at least one encryption/decryption device performing both encryption of the digital data and decryption of the digital data,
        wherein the data bus line connects the data storing device with the bus controller and transfers the digital data between the data storing device and the bus controller, and
        wherein the encryption/decryption device encrypts the digital data received from the bus controller to store the encrypted digital data in the data storing device, and decrypts the encrypted digital data stored in an end device to deliver the decrypted digital data to the bus controller;
    an ID memory device which stores a device ID; and
    an identification detecting device which detects the device ID of at least one of the device and the another device,
        wherein only if the identification detecting device detects the device ID is correct, the encryption/decryption device is configured to encrypt or decrypt the digital data.

10. The bus of claim 9, wherein the bus is a disk I/O bus.

11. The bus of claim 9, wherein the bus is an USB.

12. The bus of claim 9, wherein the bus is a PCI bus.

13. The bus of claim 9, wherein the bus is an IEEE 1394 bus.

14. The bus of claim 9, wherein the bus connects with a south bridge.

15. The bus of claim 9, further comprising a memory device which stores at least one algorithm for encryption and at least one algorithm for decryption.

16. The bus of claim 15, wherein the memory device comprises a removable medium and,
    wherein the removable medium is detachable with the bus and,
    wherein the removable medium stores the at least one algorithm for encryption and the at least one algorithm for decryption.

* * * * *